United States Patent [19]

Post et al.

[11] Patent Number: 4,629,044
[45] Date of Patent: Dec. 16, 1986

[54] CLUTCH MECHANISM COMPRISING A FREEWHEELING UNIT DISENGAGEABLE IN THE DRIVING DIRECTION

[75] Inventors: Alexander Post, Neunkirchen; Clemens Nienhaus; Klaus Kämpf, both of Lohmar, all of Fed. Rep. of Germany

[73] Assignee: Jean Walterscheid GmbH

[21] Appl. No.: 796,593

[22] Filed: Nov. 8, 1985

[30] Foreign Application Priority Data

Dec. 22, 1984 [DE] Fed. Rep. of Germany ........ 3447279
Aug. 9, 1985 [DE] Fed. Rep. of Germany ........ 3528591

[51] Int. Cl.⁴ .............................................. F16D 41/02
[52] U.S. Cl. .................................... 192/28; 192/17 R; 192/46; 192/47
[58] Field of Search ................... 192/28, 17 R, 46, 47, 192/33 R, 67 P, 22, 26

[56] References Cited

U.S. PATENT DOCUMENTS

| 2,368,892 | 2/1945 | Skoog | 192/28 |
| 2,473,366 | 6/1949 | Galliano | 192/33 R |
| 3,048,246 | 8/1962 | Paige | 192/28 |
| 4,061,216 | 12/1977 | Sullivan et al. | 192/46 |

FOREIGN PATENT DOCUMENTS

| 3332829 | 4/1984 | Fed. Rep. of Germany. | |
| 666604 | 10/1929 | France | 192/28 |
| 775457 | 11/1980 | U.S.S.R. | 192/33 R |

OTHER PUBLICATIONS

B. Junge and A. Stauffer, "Mechanical Clutch and Detent" in *IBM Technical Disclosure Bulletin;* Nov. 1965, p. 901.

*Primary Examiner*—Kenneth J. Dorner
*Assistant Examiner*—David A. Testardi
*Attorney, Agent, or Firm*—Toren, McGeady, Stanger, Goldberg & Kiel

[57] ABSTRACT

A clutch mechanism designed to include a free-wheeling unit which is disengageable in the driving direction consisting of a clutch hub and a clutch sleeve which cooperate with locking catches, with the clutch sleeve being embraced by a control ring. Control pins are radially guided in the clutch sleeve and, by turning the control ring relative to the clutch sleeve, inclined faces formed on the control ring act on the control pins to actuate the locking catches to permit disengagement of the driving connection.

8 Claims, 5 Drawing Figures

CLUTCH MECHANISM COMPRISING A FREEWHEELING UNIT DISENGAGEABLE IN THE DRIVING DIRECTION

The present invention relates to clutch mechanisms and more particularly to a clutch assembly comprising a freewheeling unit disengageable in the driving direction, consisting of a clutch hub and a clutch sleeve which, in the driving direction, are connected to each other via locking catches held in recesses of the clutch hub so as to be flexible radially outwardly.

A freewheeling unit which may be engaged and disengaged is known in the prior art from DE-OS No. 33 32 829. In the case of the freewheeling unit described, an actuating ring enters into a friction-locking connection with a friction ring. To engage the freewheeling unit, the actuating ring is fixed via a tappet, thereby having a retaining effect on the friction ring. Consequently, rollers are placed in the engaging position and the freewheeling unit is engaged.

The disadvantage of the design described is that the friction effect is subject to variation and therefore does not ensure, on a long-term basis, safe engagement and disengagement of the freewheeling unit under all operating conditions. A further disadvantage of this freewheeling unit is its complicated design which results in high production costs.

It is the object of the invention to provide a freewheeling unit which is disengageable in the driving direction, which has a simple design and permits disengagement under operating loads.

SUMMARY OF THE INVENTION

Briefly, the present invention may be defined as a clutch mechanism comprising a freewheeling unit capable of disengagement in the driving direction for freewheeling operation comprising a clutch hub and a clutch sleeve with locking catches interposed therebetween to effect torque transmitting engagement. Movable control pins are received in radial apertures in the clutch sleeve and a control ring extending about the sleeve is formed with inclined faces which engage the control pins to move them radially inwardly for actuating the locking catches to effect freewheeling operation. First stop means limit the radially inward movement of the control pins and, in the torque transmitting position, the control pins extend into recesses formed in the control ring. Second stop means are interposed between the clutch sleeve and the control ring to limit the relative angular movement therebetween and spring means act in a circumferential direction between the clutch sleeve and the control ring to apply a spring force to hold the recesses in the control ring and the control pins in corresponding positions. To effect freewheeling operation, a retaining device operates to turn the control ring against the force of the spring means, whereby the control pins are moved radially inwardly by the inclined faces to disengage the locking catches.

Thus, in accordance with the invention, the objectives thereof are achieved in that:

(a) The clutch sleeve is provided with the radial apertures in the circumferential direction corresponding to the recesses of the clutch hub to receive the movable control pins;

(b) In the torque transmitting position, the control pins which in their radially inwardly directed movement are limited by the first stop means and are radially outwardly loaded by a spring force and engage outwardly into the recesses arranged in a control ring rotatably held on the clutch sleeve and having an inclined face in the direction of rotation;

(c) The turning angle of the control ring on the clutch sleeve is limited by the second stop means connected to the clutch sleeve and engaging into a slot provided in the control ring;

(d) The clutch sleeve and the control ring are loaded relative to each other by the spring means acting in the circumferential direction in such a way that the recesses and control pins are held in positions corresponding to each other; and (e) The control ring may be turned by the retaining device against the force of the spring means.

The advantage of the freewheeling unit according to the invention is that the switching process is effected by direct action of the control pins on the locking catches. As the switching-off movement of the control pins is achieved by inclined faces on the control ring, disengagement is ensured even under high loads. Even disengagement under high torques requires relatively low forces.

In a further embodiment of the invention, the control ring and the clutch sleeve, in the torque transmitting position, are held by a catch. The advantage of this embodiment is that the freewheeling unit is not disengaged unintentionally, not even if the rotational movement is highly uneven.

In a further embodiment according to the invention, the inclined faces at the recesses are arranged at the end facing away from the direction of rotation. This design is intended for a drive coming from the clutch hub.

In another embodiment of the invention, the inclined faces at the recesses are arranged at the end facing the direction of rotation. In this embodiment, it is the clutch sleeve which is driven.

According to a further feature of the invention, the control pins are associated with additional springs acting radially outwardly.

This measure ensures reengagement of the freewheeling unit even further.

In a further embodiment of the invention, the control ring is in friction contact with an adjusting ring embracing it and having at least one stop at its outer circumference. With this design, the freewheeling unit, after disengagement, may continue to run, which is particularly advantageous if large masses are connected.

According to a further feature of the invention, provision is made for a continuous slot between the clutch hub and the clutch sleeve in the region of the locking catches. The advantage of this feature is that for disengaging the freewheeling unit, the radially inwardly pointing ends of the control pins merely have to extend into the space of the slots, which means that there is no need for close tolerances for the length and disengaging distance of the control pins.

In a further embodiment, a freewheeling unit disengageable in the driving direction has been provided with a torque measuring device in such a way that:

(f) The clutch sleeve is in two parts;

(g) The two parts of the clutch sleeve are connected to each other by measuring pins subjected to bending loads via the torque; and (h) The two clutch parts are associated with gear wheels whose teeth correspond to each other, which are aligned relative to each other and cooperate with sensors.

In this embodiment, the signal for disengaging the freewheeling unit of the torque measuring device may be taken from an evaluation unit.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described preferred embodiments of the invention.

DETAILED DESCRIPTION OF THE PREFERRED EMBODIMENTS

Figure 1:
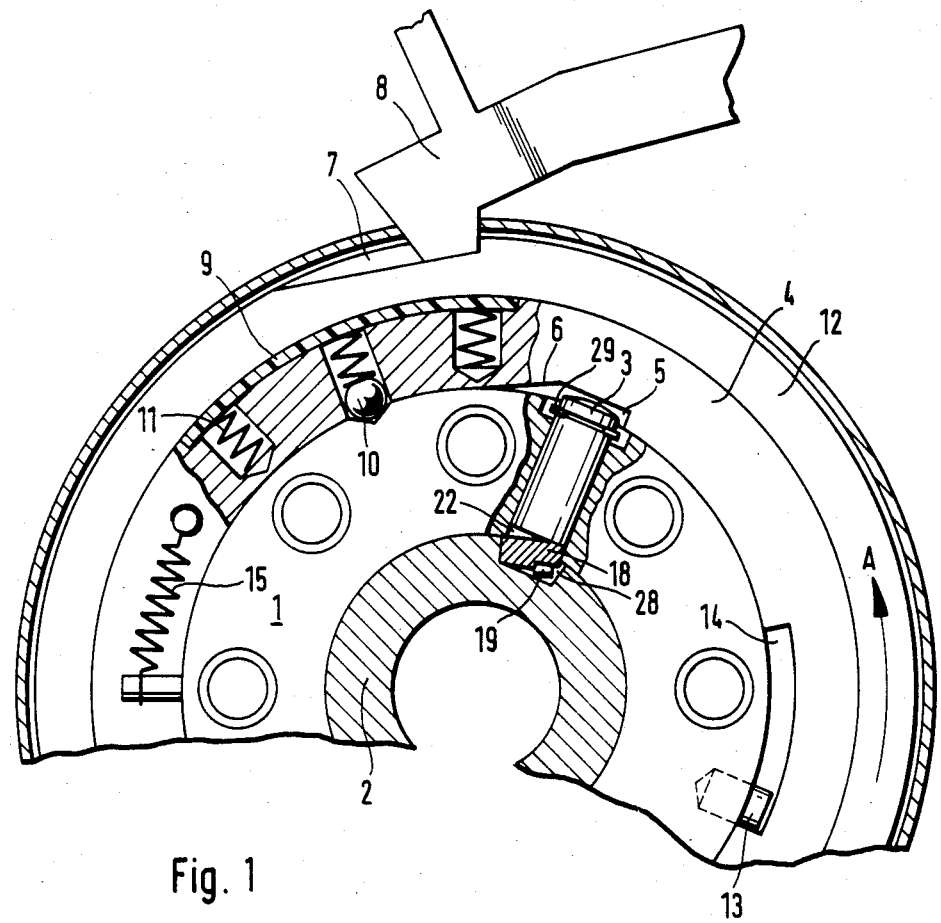
FIG. 1 is a sectional view showing the basic design of the clutch mechanism comprising a freewheeling unit in accordance with the present invention.

The freewheeling unit shown in FIG. 1 essentially consists of a clutch hub 2, a clutch sleeve 1 and a control ring 4. In the operation of the device, the drive may be effected from the clutch hub 2 to the clutch sleeve 1. Alternatively, the clutch sleeve 1 may drive the clutch hub 2.

In recesses 28 of the clutch hub 2, provision is made for locking catches 18 loaded radially outwardly by the force of the spring 19. The clutch sleeve 1 is rotatably supported on the clutch hub 2. Control pins 3 whose number corresponds to that of the locking catches 18 are guided in radial apertures 22 in the clutch sleeve 1. Stop means 29 limit the radially inward movement of the pins 3 in the apertures 22.

A control ring 4 is also rotatably supported on the clutch sleeve 1, with the rotation of the control ring 4 being limited by stop means comprising a stop member 13 arranged in the clutch sleeve 1 and cooperating with a slot 14 provided in the control ring 4. Between the clutch sleeve 1 and the control ring 4, provision is made for a spring 15 which holds the control ring 4 relative to the clutch sleeve 1 in such a position that the control pins 3 can extend radially outwardly into recesses 5 of the control ring 4. Inclined faces 6 have been provided at the end of the recess 5 facing the direction of rotation (arrow A).

In FIG. 1, an adjusting ring 12 provided with at least one stop 7 is supported on the control ring 4. Between the control ring 4 and the adjusting ring 12, there exists a friction connection represented by the friction lining 9 which, via springs 11, is pushed out of a groove of the control ring 4 against the inner circumference of the adjusting ring 12. A retention device consisting of a lifting arm 8 is provided and when the lifting arm 8 drops into the stop 7, the adjusting ring 12 is braked, thereby retaining the control ring 4 and holding the control ring 4 against the direction of rotation.

As a result, the control ring 4 turns relative to the clutch sleeve 1, the control pins 3 stop against the inclined faces 6 and, consequently, the pins 3 are moved radially inwardly in the direction of the locking catches 18 and push these out of their positive connection with the clutch sleeve 1 so that the clutch may idle or freewheel.

In addition, FIG. 1 shows a catch 10 whose purpose it is to protect the freewheeling unit from vibration related unintentional switching if a high degree of nonuniformity exists.

Figure 2:
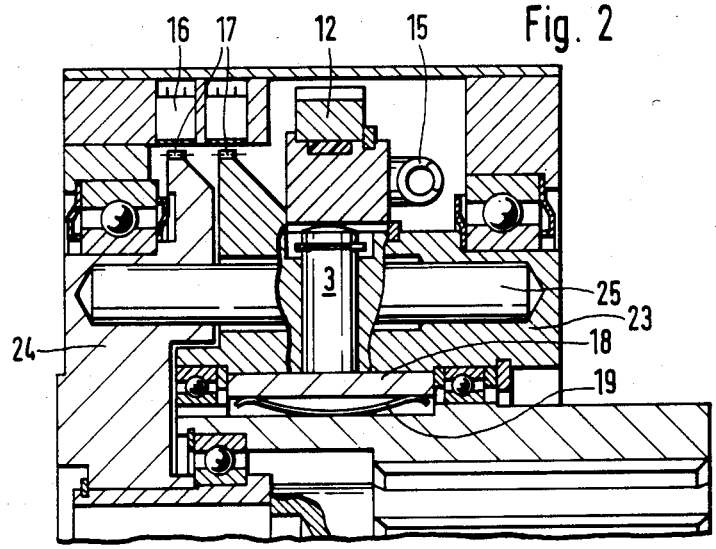
FIG. 2 is a longitudinal section through a freewheeling unit having a torque measuring device.

FIG. 2 shows a longitudinal section through a freewheeling unit connected to a torque measuring device. In this case, the clutch sleeve consists of a part 23 and a part 24 which are connected in torque transmitting engagement by pins 25. Each part of the clutch sleeve 23 and 24 is connected nonrotatingly to a gear wheel 17, with two gear wheels 17 having identical teeth and preferably being produced in one working process.

At a small distance from the outer circumference of the gear wheels 17, provision has been made for sensors 16, which may be designed as so-called Hall generators, for example.

In a suitable evaluation unit which does not form part of the application, it is possible to read the torque occurring when the gear wheels 17 turn relative to each other.

Figure 3:
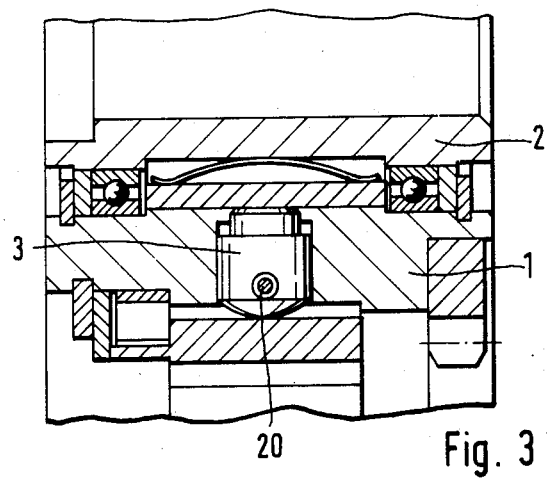
FIG. 3 is a longitudinal section through a freewheeling unit.
Figure 4:
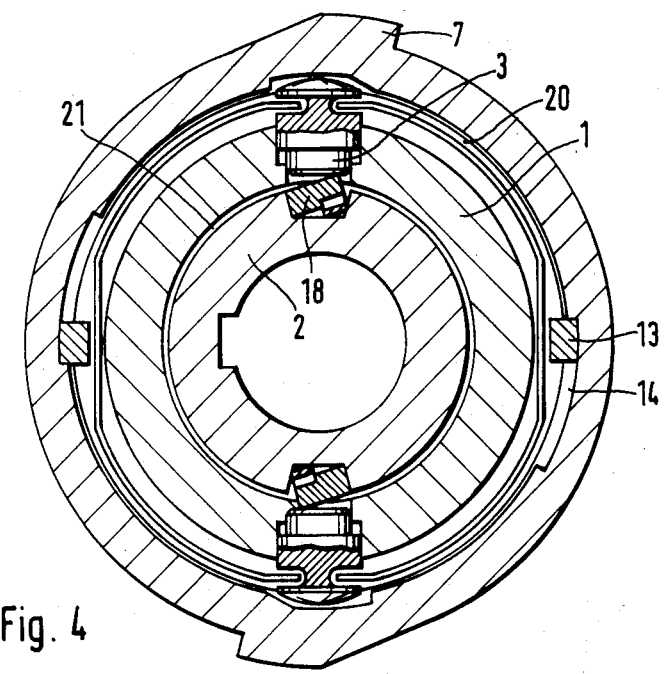
FIG. 4 is a transverse section through a freewheeling unit.

In the freewheeling unit according to FIG. 3, provision has been made for an additional spring 20 which, in addition to the spring 19 acting on the locking catches 18, exerts a radially outwardly directed force directly onto the control pins 3. FIG. 4 shows the arrangement of the additional spring 20 which is illustrated here as a semi-circular spring wire engaging into bores in the control pins 3.

A slot 21 provides a tolerance range for the action of the control pins 3 on the locking catches 18.

Figure 5:
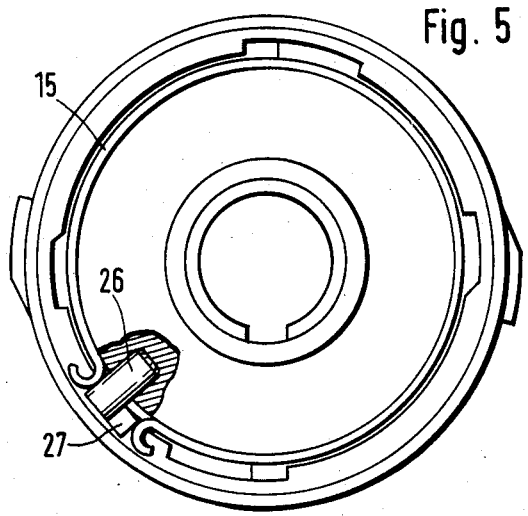
FIG. 5 is a plan view showing part of the freewheeling unit.

FIG. 5 shows the arrangement of the spring 15 acting in the circumferential direction and supported circumferentially on a stop 26 at the clutch sleeve 1 and a further stop 27 at the control ring 4.

Thus, it will be seen that, in accordance with the present invention, there is provided a clutch mechanism comprising a freewheeling unit which is disengageable in the driving direction, which has a simple design and permits disengagement under operating loads.

The objective is achieved by providing a freewheeling unit which consists of the clutch hub 2 and the clutch sleeve 1, which cooperates with locking catches 18 and whose clutch sleeve 1 is embraced by the control ring 4. In the clutch sleeve 1, control pins 3 are radially guided. By turning the control ring 4 relative to the clutch sleeve 1 and by acting via suitable inclined faces 6 onto the locking catches 18, the control pins 3 permit disengagement of the drive.

While specific embodiments of the invention have been shown and described in detail to illustrate the application of the inventive principles, it will be understood that the invention may be embodied otherwise without departing from such principles.

What is claimed is:

1. A clutch mechanism having a freewheeling unit capable of disengagement in a driving direction thereof for freewheeling operation comprising:
   a clutch hub having recesses formed therein;
   a clutch sleeve having radial apertures circumferentially spaced thereabout corresponding to said recesses in said hub;
   movable control pins received in said radial apertures;

locking catches in said recesses resiliently urging said control pins radially outwardly for effecting torque transmitting engagement between said clutch hub and said clutch sleeve;

first stop means limiting radially inwardly directed movement of said control pins;

a control ring having recesses formed therein and inclined faces and rotatably held on said clutch sleeve, said control pins being resilient used by said locking catches radially outwardly to engage in said recesses in said control ring in a torque transmitting position;

second stop means interposed between said clutch sleeve and said control ring limiting relative angular movement therebetween;

spring means acting in the circumferential direction interposed between said clutch sleeve and said control ring applying a spring force to hold said recesses in said control ring and said control pins in positions corresponding to each other; and a retaining device adapted to hold said control ring against the force of said spring means to move said control pins radially inwardly against said locking catches to effect freewheeling operation.

2. A mechanism according to claim 1, further comprising a catch holding said control ring in said clutch sleeve together in the torque transmitting position.

3. A mechanism according to claim 1, wherein said inclined faces are arranged at an end of said recesses facing away from the direction of rotation.

4. A mechanism according to claim 1, wherein said inclined faces are arranged at an end of said recesses facing the direction of rotation.

5. A mechanism according to claim 1, further comprising additional springs associated with said control pins acting radially outwardly.

6. A mechanism according to claim 1, further comprising an adjusting ring having at least one stop on an outer circumference thereof arranged in friction contact about said control ring.

7. A mechanism according to claim 1, wherein a continuous slot is formed between said clutch hub and said clutch sleeve in the region of said locking catches.

8. A mechanism according to claim 1, including a torque measuring device, wherein said clutch sleeve is formed in two parts, wherein said two parts of said clutch sleeve are connected to each other by measuring pins which are subjected to bending loads by means of torque forces in said mechanism and wherein said two clutch sleeve parts are associated with gear wheels having teeth corresponding to each other which are aligned relative to each other and which cooperate with sensors.

* * * * *